United States Patent
Jawanda

(10) Patent No.: US 6,229,793 B1
(45) Date of Patent: May 8, 2001

(54) METHODS AND SYSTEMS FOR TANDEM IWF INTERCONNECTIVITY

(75) Inventor: Jastinder S. Jawanda, Plano, TX (US)

(73) Assignee: Nortel Networks Limited, Montreal (CA)

(*) Notice: Subject to any disclaimer, the term of this patent is extended or adjusted under 35 U.S.C. 154(b) by 0 days.

(21) Appl. No.: 08/980,100

(22) Filed: Nov. 26, 1997

(51) Int. Cl.[7] ............................................. H04G 7/24
(52) U.S. Cl. ................................... 370/328; 370/249
(58) Field of Search ................................. 370/300, 302, 370/312, 328, 342, 343, 389, 432, 441, 465, 467, 536, 249

(56) References Cited

U.S. PATENT DOCUMENTS

| | | | | |
|---|---|---|---|---|
| 5,293,378 | * | 3/1994 | Shimizu | 370/474 |
| 5,533,019 | * | 7/1996 | Jayapalan | 370/352 |
| 5,726,764 | * | 3/1998 | Averbush et al. | 358/403 |
| 5,734,699 | * | 3/1998 | Lu et al. | 455/422 |
| 5,793,744 | * | 8/1998 | Kanerva et al. | 370/209 |
| 5,805,301 | * | 9/1998 | Rasanen | 358/425 |
| 5,878,343 | * | 3/1999 | Robert et al. | 455/424 |

FOREIGN PATENT DOCUMENTS

WO 98/17076  *  4/1998  (WO) .............................. H04Q/7/24

* cited by examiner

Primary Examiner—Hassan Kizou
Assistant Examiner—Ahmed Elallam
(74) Attorney, Agent, or Firm—Carr & Storm, L.L.P.

(57) ABSTRACT

A unique byte is used to bookend commands and data for the purpose of allowing inband signalling and command communication between the IWF and the BSC portions of a mobile communication system having DS0 maximum data rate transfer capability per data channel. The receipt of two consecutive ones of the unique bytes indicates that the next 2 bytes will be a command. The receipt of 3 consecutive ones of the unique bytes indicates the next byte will be data. This inband signalling and data transfer allows the IWF functionality to be remote from the main switch used by a given BSC. The CDMA system uses the inband signals to pass a plurality of data packets in parallel on DS0 capacity channel links through the MTX in a half-duplex burst whenever a data buffer within the IWF or a connected high data transfer rate mobile station is filled to a given level. This burst process may operate on a time multiplex basis with low speed data transfers using the same DS0 links to communicate with the IWF. To simplify the design of the burst process mechanism as concerns the bit robbing occurring in the least significant bit position of each DS0 channel every 6th frame on DS1 communication lines linking the BSC and the MTX, only the 7 most significant bit positions of a data byte are used in the data transmitted between a IWF entity and the SBS portion of a mobile network.

3 Claims, 3 Drawing Sheets

FIG. 4
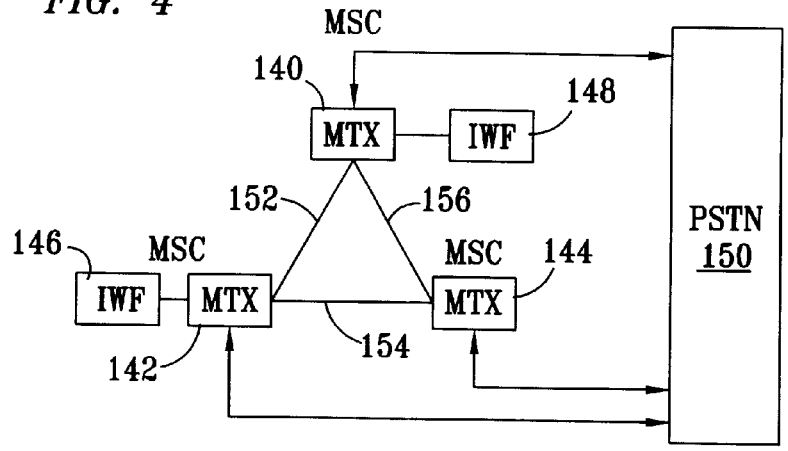
FIG. 5
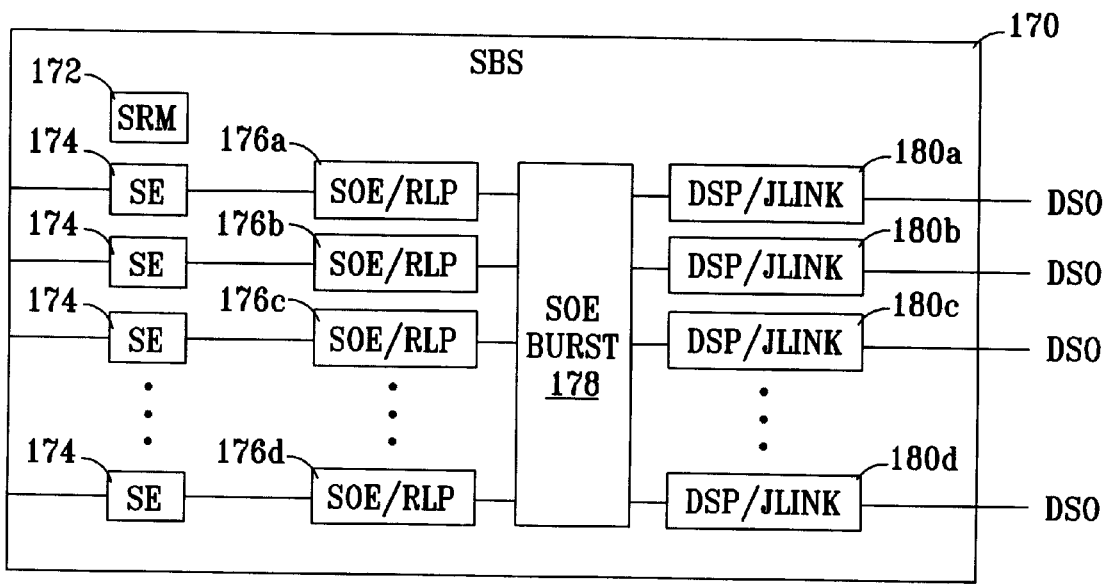
FIG. 6
MASK BYTE
| 1 | 0 | 0 | 0 | 0 | 0 | X |
FIG. 7
SYNCH BYTE
| 1 | 0 | 1 | 0 | 1 | 0 | 1 | X |

FIG. 8
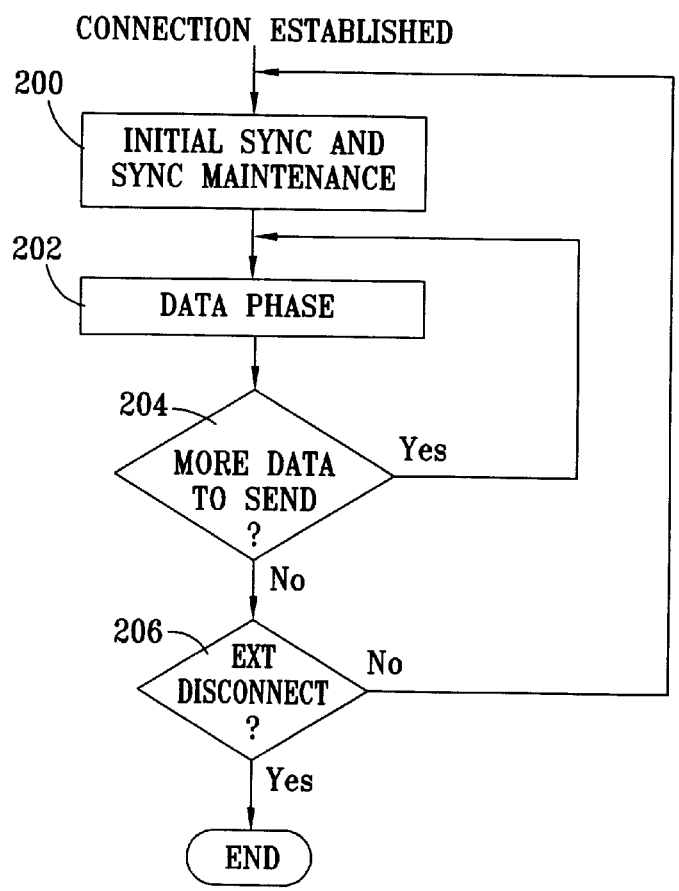
FIG. 9 DSI SIGNALING BIT POSITION
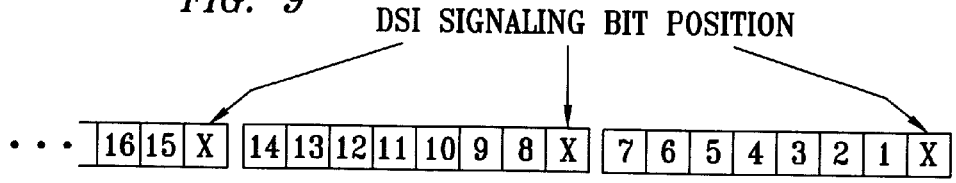
FIG. 10
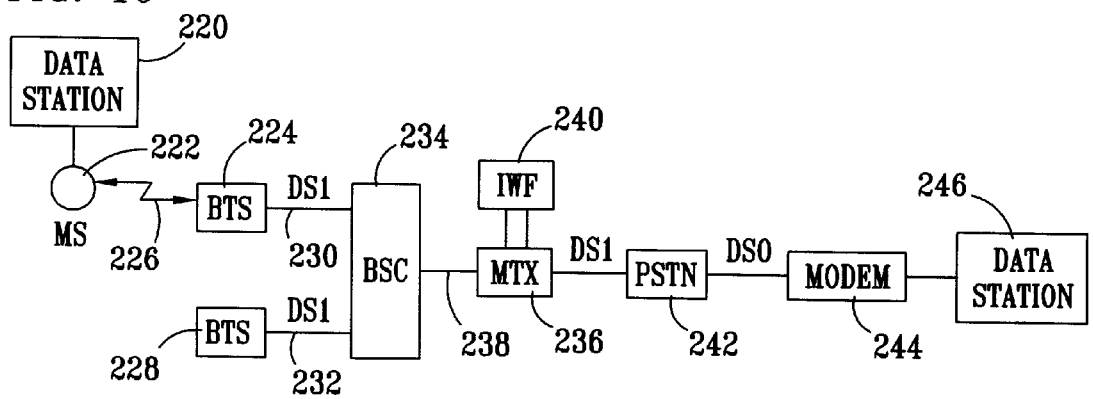

METHODS AND SYSTEMS FOR TANDEM IWF INTERCONNECTIVITY

CROSS REFERENCE TO RELATED APPLICATIONS

The following co-pending United States Patent Application filed concurrently. with this application contains related information and is incorporated herein by reference:

U.S. Patent Application of Jastinder Jawanda entitled "METHODS AND SYSTEMS FOR TRANSMITTING DATA" [Attorney Docket No. 17275-P039US (RR2140)] filed of even date herewith.

TECHNICAL FIELD

The present invention relates in general to communications and in particular to methods and systems for connecting an interworking function entity to a selected MSC through another MSC.

BACKGROUND

Present day land line telephone systems such as PSTN (Public Switched Telephone Networks) in the USA convert a voiceband channel to a digital stream referred to as a DS0 level having a bit rate of 0.064 Mb/s (Megabits per second). The DS0 level comprises 8 bit bytes representing a voice level at any given instant in the conversion process. Traditionally these 8 bit bytes are referred to in the art as octets. A plurality of these DS0 channels are stacked (multiplexed) onto higher level bit streams. An example of a higher level bit stream is a DS1 level containing 24 DS0 or voice-grade channels. In the United States, a DS1 channel operates at 1.544 Mb/s. Since 24 multiplied by 0.064 Mb/s is 1.536 Mb/s it is apparent that this leaves 8 kb/s (kilo bits per second) for overhead bits to be used for framing or synchronization purposes. A frame includes an octet of each of the 24 channels in a DS1 bit stream. The first octet of the frame represents the voice level in channel 1 and the last octet represents the voice level of channel 24.

The framing bits are used at the receiving end of a transmission line or immediately prior to a switch to define the beginning of a frame or in other words where channel 1 starts. In telephony parlance, a series of 24 channels of data bits is referred to as a frame and 12 frames are referred to as a superframe in one frame detection format used in the United States. When using the 12 frame superframe (SF) format or the 24 frame extended superframe (ESF) format, the least significant bit of each voice channel is "robbed" every 6th frame and replaced with signalling information associated with the voice channel. This voice channel associated signalling information is used for channel supervision and addressing, such as call setup and call completion.

These "robbed" bits are not discernable by a user when voice communication occurs. However, the technique may cause errors when binary data is transferred via modems over a voice grade channel unless special precautions are taken to determine the time when the robbed bits occur and synchronize the data transmission accordingly.

In the prior art, a software entity, or object designated as an interworking function (IWF-basically a modem function) has been used in CDMA (Code Division Multiple Access) type cellular communication systems to convert data to a protocol and format compatible with the destination network receiving the data. As is known to those skilled in the art, CDMA systems provide direct digital transmission in a low-bit-rate speech coding scheme that does not allow transmission of voiceband modem signals.

In a CDMA system, the circuit mode data services utilize the direct access to the digital radio channels. Information is exchanged as packetized data between the mobile terminal and the IWF using established data protocols in conjunction with the digital radio channel. At the IWF, the data packets received from the mobile terminal are converted into voiceband modem signals suitable for transmission over the PSTN (Public Switched Telephone Network) and vice versa. Thus the CDMA circuit mode data services have been used for point to point connectivity through the PSTN wherein a mobile terminal such as a portable PC (personal computer) may be interconnected to another unit such as a wireline desktop PC running in either the asynchronous data reception or in the fax application mode and data may be transmitted therebetween.

When a voice call is made from a MS (mobile station) to a PSTN termination point, the call passes through a BTS (Base station Transceiver Subsystem) to a BSC (Base Station Controller) and then to an MTX (Mobile Telephone eXchange) before being passed to the PSTN network. The voice call uses various software entities within the BTS, the BSC and the MTX including a SOE (Service Option Element) and a DSP (Digital Signal Processor) and outputs a PCM (Pulse Code Modulated) DS0 signal. A data call, in one prior art embodiment, used the same entities except that the software load for the SOE and DSP was different and the DS0 signal output from the DSP was in a ISLP (Inter-System Link Protocol) format. The data signal is passed through the IWF to alter the protocol to a PSTN compatible format before being returned to an MTX for forwarding to the PSTN. The prior art systems referenced used an out of band ethernet interface for exchange of control and signaling messages between the MTX and the IWF for these data calls. This design required an IWF entity for each MTX providing data call service. Especially in new systems, this can be a considerable waste of resources.

It would be more desirable to be able to use a single IWF for a plurality of MTXs in a system with the option of adding IWFs as the number of data calls is noted to be increasing.

Prior art mobile stations only had the capability of transmitting data on one RF channel due to system and MS constraints. These constraints resulted in a maximum data rate transfer of 9.6 Kbs. In such a system, a BSC transports data received over one RF channel from an MS to the IWF, over one DS0 channel between the BSC and the IWF. Thus the design of an MTX, its BSC and the interconnection from the BSC through the MTX allowed a maximum data rate of only 9.6 Kps over one DS0 channel. Presently proposed new equipment standards permit up to at least 8 RF channels to be used simultaneously by a mobile station for transmitting a parallel burst of data packets, one on each of several RF channels, to or from an associated BTS thus accomplishing a total quantity of data transmitted to be at a rate higher than the maximum transmission rate possible with one DS0 link. Networks on the PSTN side of the communication system are also now capable of receiving or transmitting data on more than one DS0 channel simultaneously. Thus, it would be desirable that the MTX and associated BSC equipment have the capability to interconnect the new proposed mobile stations and similar equipment connected to wireline facilities for high speed data transfer with minimum redesign.

SUMMARY OF THE INVENTION

The present invention provides a method and apparatus for interconnecting a single IWF to and through a plurality of MTXs to their associated BSCs for use by any or all of the plurality of BSCs.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 illustrates a tandem connection whereby a single IWF can service more than one MTX;

FIG. 5 is a block diagram of a SBS used in implementing a preferred embodiment of the present invention;

FIG. 6 illustrates the configuration or format of a mask byte;

FIG. 7 illustrates the format of a synch byte;

FIG. 8 comprises a flow diagram of the operation of the JLink protocol;

FIG. 9 illustrates the format of the transmitted JLink data bytes; and

FIG. 10 is a block diagram of a mobile communication system, the PSTN and communicating data stations operating therethrough.

DETAILED DESCRIPTION

Figure 1:
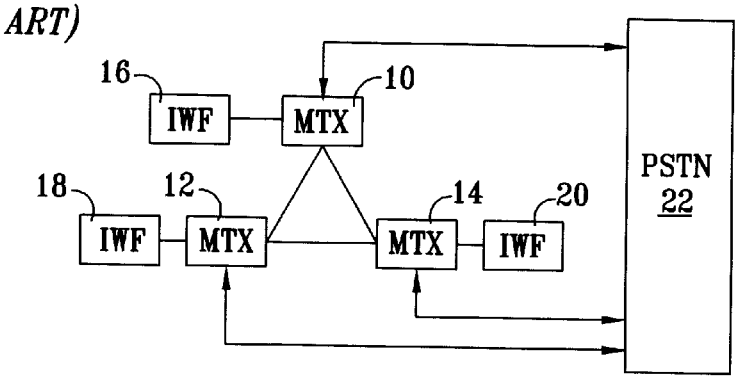
FIG. 1 is a representation of a prior art mobile communication system with a distributed IWF for each MTX.

In FIG. 1 an MTX 10 is shown connected to an MTX 12 as well as to an MTX 14. There is also a connection between MTX 12 and the MTX 14. An IWF 16 is shown connected to MTX 10 while an IWF 18 is shown connected to MTX 12. An IWF 20 is shown connected to MTX 14. Each of the blocks 10 through 14 has a separate DS1 capacity or higher connection to a PSTN (Public Switched Telephone Network) 22 either directly, through another MTX or through some other type switch. As is known to those skilled in the art, the data signals processed by the IWFs are returned to the associated MTX for forwarding to their destination point.

Figure 2:
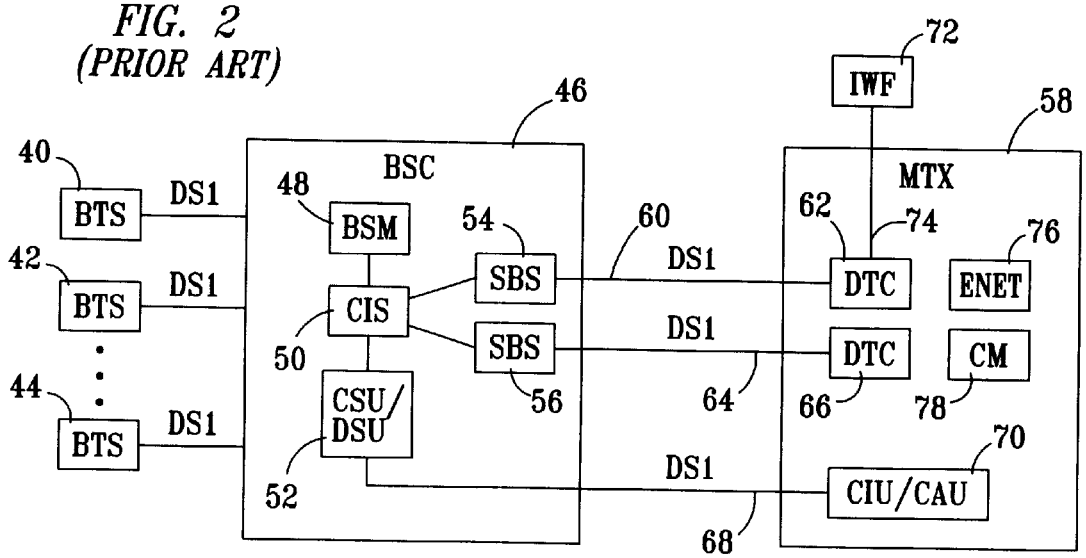
FIG. 2 is a representation of a prior art MTX and its associated equipment.

In prior art FIG. 2 a plurality of BTS's 40,42 and 44 are shown connected via a DS1 connection to a BSC block 46. Within the block 46 there is shown a BSM (base station manager) block 48, a CIS (CDMA Interconnect Subsystem) block 50, a CSU/DSU (Customer Service Unit/Data Service Unit) block 52 and SBS (Selector Bank Subsystem) blocks 54 and 56. Although not shown specifically, the incoming DS1 lines from the BTS blocks are applied to CIS block 50 and distributed from there to the SBS blocks. Each SBS block has one or more individual DS1 capacity lines supplying signals to an MTX block 58. As shown, SBS 54 has a lead 60 connected to a DTC block 62 within the MTX block 58. A further DS1 line 64 is connected from SBS block 56 to a DTC (Digital Trunk Controller) block 66. A further DS1 line 68 interconnects block 52 in BSC 46 to a CIU/CAU (CDMA Interface Unit/CDMA Application Unit) block 70 within MTX 58. A connection or lead 74 interconnects DTC 62 with an IWF block 72. Also shown within block 58 is a block 76, labeled ENET, representing an Enhanced NETwork, operating to transmit signaling messages between the MTX 58 and the IWF 72 and a CM (Call Management) block 78. It should be noted that the combination of the functionality of an MTX with or without an accompanying IWF are often referred to, by those skilled in the art, as an MSC (Mobile Switching Center).

Figure 3:
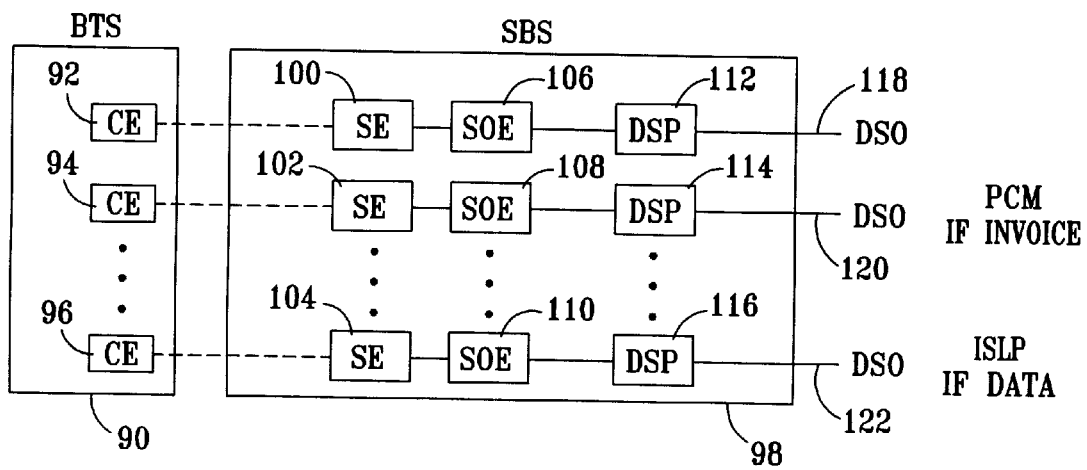
FIG. 3 provides more detail for the BTS and SBS portions of FIG. 2.

In a FIG. 3 a BTS block 90 is shown including three CE (channel element) blocks 92, 94 and 96. An SBS block 98 is shown with three SE (service element) blocks 100, 102 and 104. Also shown are SOE (Service Option Element) blocks 106, 108 and 110. Further, three DSP (Digital Signal Processor) blocks 112, 114 and 116 are shown each with DS0 outputs 118, 120 and 122 respectively. When a voice signal is transmitted from a mobile station through a CE such as 92 within BTS 90 to an SE 100 within SBS 98, SOE 106 and DSP 112 are loaded to provide a voice protocol program operating upon the signal to provide a PCM (pulse code modulated) format signal on DS0 line 118. If on the other hand, a data signal is being supplied from a mobile station through CE 92, the SOE 106 and DSP 112 are loaded with a RPL (Radio Protocol Link) program such that the output on line 118 is in the ISLP (Inter-System Link Protocol) format. It should be noted that the dots between the identically labeled blocks in FIG. 3 represent additional elements of that type within both the BTS 90 and the SBS 98.

In FIG. 4 a plurality of MTX blocks 140, 142 and 144 are arranged in a manner similar to that of prior art FIG. 1. An IWF block 146 services MTX 142 while a further IWF block 148 services both MTX 140 and MTX 144. As indicated previously the term MSC may be used to designate a given switching site. The MTXs are interconnected by high-speed trunk lines shown as a 152, 154 and 156 again in a manner similar to that of FIG. 1. A PSTN network 150 is shown and would be connected to the various IWF and MTX blocks as it would occur in the prior art. However no actual connections are shown since such connections are well known to those skilled in the art.

In FIG. 5 an SBS block 170 is shown that would be substituted for some of the prior art SBS blocks such as 54 in FIG. 2 for use in high speed data transfer operations. Within SBS block 170 there is shown a SRM (Selector Resource Manager) block 172. Also shown are shown a plurality of SE blocks 174. The SE blocks would be connected to CE blocks and operate in much the same manner as in the prior art illustration of FIG. 3. Each of the SE blocks 174 is connected to a respective SOE block 176. Each of these entities 176 operates in the RLP (Radio Link Protocol) mode. Each of the SOE blocks 176 is connected to an SOE burst block 178. The block 178 is additionally connected to a plurality of DSP blocks 180. As illustrated each of these DSP blocks 180 operates in a JLink protocol mode. The DS0 output from each of the blocks 180 is supplied to a DTC block in the manner of the prior art in FIG. 2.

FIG. 6 illustrates the configuration or format of a mask byte with the most significant bit being a 1, the remaining bits being 0 except that the least significant bit is shown as an X. When a bit is shown as an X, the accepted meaning is that the circuitry doesn't care about the logic value of that bit position. In order to assure that data transmitted over the JLink is not mistaken for a mask byte, a bit insertion and extraction process of the type used in the prior art HDLC framing process may be used to insert a logic "1" into a given data bit position such as after the fifth one of five consecutive logic "0"s.

FIG. 7 illustrates the format of a synch byte and shows that the most significant bit position is a logic 1 with a series of intermixed logic "0" and logic "1" bits down to the second least significant bit position. The least significant bit position is an X.

In the flow diagram of FIG. 8 a sync phase block 200 is shown as receiving data after a connection is established by means external to the JLink protocol. The program then moves to a data phase block 202 after the synchronization phase is completed if there is data in the buffers at that time to transmit, otherwise it remains in a synchronization maintenance mode until data needs to be transmitted. When data is transmitted from either the IWF or the SOE, it is transmitted for, a given number of bytes as established by previous conditions. After the established number of bytes has been transmitted, the program moves to a decision block 204 where a check is made to determine whether or not there is more data to send. If more data needs to be sent, the program returns to the data phase block 202. If no more data needs to be sent the program moves to a decision block 206 to see whether or not an external disconnect has occurred. If it hasn't, the program returns to the sync phase block 200 where alternate sync and mask bytes are sent for the purpose of sync maintenance until further data needs to be forwarded. If, upon the other hand, an external disconnect has been received, the JLink protocol program ceases operation.

FIG. 9 illustrates the format of the transmitted JLink data. The first, second and part of a third byte of JLink formatted data are illustrated. The most significant seven bit positions of each transmitted JLink byte are used such that the eighth bit of user data appears in the second least significant position of the second byte as illustrated. The 15th bit of a given set of user data appears in the second least significant bit position of the third byte. As was the case with the synch bytes and the mask bytes, the least significant bit position is designated as an X and is not utilized by the receiving entity that transforms the JLink format data bytes to another format for distribution to the terminating station.

FIG. 10 illustrates a system having a call end point comprising a data station 220 such as a computer or facsimile device. It is connected to a mobile station 222 including an antenna (not shown) for communicating with a BTS 224 via a radio link 226. In a typical system, a plurality of BTSs, each defining a cell of operation are connected to a single BSC. As shown, BTS 224 and a further BTS 228 are each connected to a BSC 234 via DS1 capacity lines designated as 230 and 232 respectively. BSC 234 includes the components shown in block 46 of prior art FIG. 2 and may include SBSs of the type often used in the prior art which only accommodated voice channels. BSC 234 also includes at least one SBS of the type shown in FIG. 5. BSC 234 is connected to an MTX or other main switch 236 via a communication link 238 which typically comprises a plurality of DS1 channels similar to that shown in prior art FIG. 2. An IWF 240 is shown connected to MTX 236 for receiving data to be processed and returning same to the MTX for forwarding to the receiving party whether that receiving party be a mobile station or a landline station. A block 242 represents the PSTN which is shown connected through a modem 244 to a data station 246 which again may be any data receiving or transmitting device such as a computer or facsimile device.

OPERATION

Although the operation of the above detailed figures may well be apparent to one skilled in the art, a review of the process for a low speed call as well as a high speed call will be provided for the edification of others.

A low speed data call as defined in the CDMA industry uses a single air channel and has a maximum data transmission rate of 9.6 Kbs (kilobits per second). By industry agreement, mobile station equipment about to be introduced onto the market will be designed to normally use a single air channel to maintain a connection to the mobile switch and to additionally transmit bursts of data on a plurality of air channels whenever internal data buffers reach a predetermined fullness. These mobile stations will also be able to receive bursts of data on a plurality of air channels in a similar manner when data buffers within the BSC make provisions to do so. The burst of data from the mobile station only occurs after the mobile station requests permission from a main switch (such as the MTX) to send a burst and receives a permissive acknowledgement. In instances where more than one air channel is desired for data transfer, the maximum preferred or desired rate requested by the caller is supplied as part of the call setup data and the mobile switch system makes a determination as to how many air channels it can provide up to the requested maximum rate and so informs both the calling and called stations.

When a low speed data call is made from one of the data stations 220 or 246 to the other, the call is setup or established using, for the most part, techniques and procedures set forth in the prior art. The primary difference with respect to voice calls being that the data supplied as part of the call setup would indicate that this is a data call and that only one air channel is requested. From this information, the CIS 50 selects a data channel passing through a data type SBS selector card such as shown in FIG. 5 rather than a voice type SBS selector card. A data call would further be setup so that the data would pass through the IWF entity as shown in FIGS. 2 and 10.

If is first assumed that the call is made from block 220 to block 246 in FIG. 10. The call would be transmitted on the single air channel shown as 226 to the BTS 224. Within block 224, the data would be deposited in the appropriate channel position of the serially multiplexed line 230 for transport to BSC 234. Within BSC 234 it would eventually arrive at a SOE such as 176a in FIG. 5 where it would be converted from radio link protocol data packets to a series of data bytes for transmission to the IWF 240.

The IWF 240 communicates with the SOE 176a using a novel JLink protocol set forth herein. In the case of a low speed data call, the burst SOE 178 is substantially transparent to the data transmission process. As part of the call setup process, the connection between the IWF and the SOE 176a has already been established. Immediately after connection is established, as shown in FIG. 8, the synchhronization phase 200 starts. Both the IWF 240 and SOE 176a send a given plurality of synchronization bytes such as shown in FIG. 7 to the other entity. If data is contained in the data buffers of either of these entities at this time (after completion of the transmission of said given plurality of synchhronization bytes) data bytes are transmitted until the data buffer is depleted. Mask bytes, such as shown in FIG. 6, interspersed with synchhronization bytes are then transmitted for synch maintenance until further data bytes need to be transmitted as illustrated in FIG. 8. Since this is a full duplex connection, both the IWF and the SOE may be simultaneously transmitting data to the other entity.

A further part of the JLink protocol is that only the seven most significant bits of each transmitted byte are used as shown in FIG. 9 for data and in FIGS. 6 and 7 for the mask and synch bytes. This eliminates the need to provide the additional compensation and DS1 signal synchhronization (and circuit complexity) to avoid errors due to bit robbing on the DS1 rate links used between the SBS and the MTX as shown in prior art FIG. 2. As will be noted, when the IWF is tandemly connected, DS1 or higher rate links are used between MTXs to carry the data being transferred. Although this approach limits the maximum data transmission rate to 56 Kbs, the reduced circuit complexity more than compensates for this slight reduction in bandwidth. Further the fact that a single air link has a maximum data rate of 9.6 Kbs, at the present time, reinforces the use of this JLink concept.

The IWF, upon receiving data from the SOE, reformats the data for transmission over PSTN lines in much the same fashion as a commonly used telephone modem and returns the reformatted data to the MTX for forwarding to the destination station. This reformatting takes place even where the destination station is another mobile station since the IWF contains no data indicative of the destination and further even if the IWF software had access to destination data, the destination station may be in a remote mobile network and thus interconnected by DS1 or other PSTN type links.

A call from block 246 to 220 would follow substantially the same procedure for setting up the call, choosing an appropriate SBS data card and passing the data through the IWF to get to the SBS.

When a high speed data call is set up, either station 246 or 220 may request more than one air link of the type designated as 226 in FIG. 10. Such a call would administratively be charged a higher rate per minute of usage because of the additional resources used by the mobile network. Further, the battery drain on a mobile station for generating the power necessary to transmit or receive multiple data packet bursts simultaneously needs to be considered. Thus, one would not automatically choose to request multiple air links for all calls solely on the basis of speed of data transfer. Further, the mobile network may already have the data handling portion of the SBS substantially fully occupied. Therefore, a request for 8 air links may very well be limited to only two or three air links by the mobile system.

For the purposes of this explanation, it may be assumed that a request for 8 air links to transfer a burst of data is granted. It will be apparent that there is the potential for 72 Kbs of data to be transferred. Since a JLink channel can only pass a maximum of 56 Kbs of data, the system would have to use 2 JLink DS1 channels to transfer data in a burst between the SBS and the IWF entities. However, the inventive concept provides for a single air link and a single JLink channel to be normally operational. Thus there is always a connection between the calling and called parties. Data is transferred over the initially set up air link and JLink channel in the same way as explained previously for a low data rate call. If data is being received from data station 220 by the mobile station 222 at a higher rate than can be transmitted over the single air link 226 and an internal buffer within MS 222 exceeds a given fullness, the MS 222 sends a burst request to a CM like that of block 78 as illustrated in FIG. 2 within MTX 236. When the burst request is granted, a plurality of air links like 226 are temporarily assigned by BTS 224 for use by MS 222. A burst of data packets is sent substantially simultaneously on the 8 air links allowed and these data packets are serially transmitted on DS1 line 230 to BSC 234. A single DS1 type link has many times the data transfer capacity of 8 air links. The burst of data is received by a single SOE, such as 176a in FIG. 5. This SOE would have been receiving data before the burst request and transparently passing the data through the burst SOE 178 to the corresponding DSP 180a for transfer on a single DS0 channel to the IWF 240. Since the system has been expecting the data burst, the IWF 240 already knows that, for the duration of the data burst, the burst SOE 178 will take data bytes received from SOE 176a and alternately send them not only to the normally used DSP 180a but also to another, preempted, DSP such 180b. The JLink protocol will be used to bookend the data bytes for the data being transmitted on the DS0 outputs of both DSP blocks 180a and 180b. The "bookending" comprises, in one embodiment, of providing three mask bytes at the beginning and the end of each set of data. Commands, on the other band, are distinguished by being bookended by two mask bytes. Since the JLink protocol operates in a half duplex mode, data may still be transferred from IWF 240 through DSP 180b and burst SOE 178 to SOE 176b for another existing data call during the time that it has been preempted for temporary use to handle the burst of data from MS 222. Since the system has already informed the MS 222 how many data packets could be sent in a burst, the passage of the given number of data packets (actually reformatted into 7 bit bytes) through the burst SOE 178 allows the return of DSP 180b to its normal function of interfacing with SOE 176b in a full duplex mode. As will be realized, the number of bits to be transmitted will typically not coincide with the last bit position of a seven bit byte. The reformatting may be set up so that the final byte of the burst provides data as to how many bit positions of the next to the last byte are padded with non-data. During the time that DSP 180b was preempted, data could be building up in a buffer within SOE 176b. If the buffer within SOE 176b gets too full, it has the capability of telling its connected MS to either resend data, slow down or stop sending data depending upon a given system setup configuration.

Although the inventive concept allows the usage of more than 2 DS0 channels to be used in a data burst transfer between an SOE and the IWF, presently available MSs would not require same and thus only 2 DS0 channels were used in the above example explanation of operation.

On a given call setup, data may be transferred from block 246 to block 220 in the same manner as set forth above for normal data transfer and burst data transfer except that the IWF 240 is the entity requesting the use of multiple channels and air links to accomplish a data burst through the burst SOE 178.

Although the invention has been described with reference to a specific embodiment, these descriptions are not meant to be construed in a limiting sense. Various modifications of the disclosed embodiments, as well as alternative embodiments of the invention, will become apparent to persons skilled in the art upon reference to the description of the invention. It is therefore, contemplated that the claims will cover any such modifications or embodiments that fall within the true scope and spirit of the invention.

What is claimed is:

1. A selector bank subsystem apparatus in a mobile station communication system, comprising:
   a first plurality p of service option elements, each of said service option elements being configured for processing a channel of data having information on the specific service option provided to a user by said mobile station communication system;
   a second plurality p of corresponding digital signal processors; and
   at least one burst service option element for processing a plurality M of serial channels of data between a given service option element and a M plurality of said digital signal processors where each of said digital signal processors processes one of said M channels, said plurality M being no greater than p.

2. A cellular communication system, comprising:
   a Mobile Telephone Exchange (MTX);
   a Base station Transceiver Subsystem (BTS);
   a Base Station Controller (BSC) interconnected between said MTX and said BTS;

an Interworking Function (IWF) configured for converting a signal into a form compatible with a destination network receiving the data;

first means within said BTS for combining data, received substantially simultaneously on a plurality of data channels from a mobile station, to form a serial set of data packets for forwarding to said BSC; and second means within said BSC for forwarding data packets, serially received from said BTS, in parallel on a plurality of data channels through said MTX to said IWF.

3. A cellular communication system, comprising:

a Mobile Telephone Exchange (MTX);

a Base station Transceiver Subsystem (BTS);

a Base Station Controller (BSC) interconnected between said MTX and said BTS;

an Interworking Function (IWF) configured for converting a signal into a form compatible with a destination network receiving the data;

first means within said BTS for combining data, received substantially simultaneously on a plurality of data channels from a mobile station, to form a serial set of data packets for forwarding to said BSC; and second means within said BSC for forwarding data packets, serially received from said BTS, in parallel on a plurality of data channels through said MTX to said IWF, said second means comprising a burst SOEs interconnected between a plurality of Service Option Elements (SOEs) and a plurality of Digital Signal Processes (DSPs).

* * * * *

UNITED STATES PATENT AND TRADEMARK OFFICE
CERTIFICATE OF CORRECTION

PATENT NO. : 6,229,793 B1
DATED : May 8, 2001
INVENTOR(S) : Jawanda

It is certified that error appears in the above-identified patent and that said Letters Patent is hereby corrected as shown below:

Column 1,
Lines 6-12, delete:
"The following co-pending United States Patent Application filed concurrently, with this application contains related infromation and is incorporated herein by reference:

U.S. Patent Application of Jastinder Jawanda entitled "METHODS AND SYSTEMS FOR TRANSMITTING DATA" [Attorney Docket No. 17275-P039US (RR2140)] filed of even date herewith."

Column 4,
Lines 46-47, delete new paragraph

Column 5,
Line 7, delete the comma after "for"
Line 13, insert a comma after "sent"

Column 6,
Lines 44, 46, 49-50, 52, and 61, delete "synchhronization" and insert -- synchronization --

Signed and Sealed this

Nineteenth Day of February, 2002

*Attest:*

JAMES E. ROGAN
*Attesting Officer*     *Director of the United States Patent and Trademark Office*